United States Patent
Hieb

(10) Patent No.: US 11,876,667 B2
(45) Date of Patent: *Jan. 16, 2024

(54) BROADBAND WATCHDOG

(71) Applicant: DISH Network L.L.C., Englewood, CO (US)

(72) Inventor: Eric Hieb, Parker, CO (US)

(73) Assignee: Dish Network L.L.C., Englewood, CO (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/399,691

(22) Filed: Aug. 11, 2021

(65) Prior Publication Data

US 2021/0377101 A1    Dec. 2, 2021

Related U.S. Application Data

(63) Continuation of application No. 16/785,164, filed on Feb. 7, 2020, now Pat. No. 11,095,499, which is a continuation of application No. 15/833,729, filed on Dec. 6, 2017, now Pat. No. 10,594,545.

(51) Int. Cl.
| | |
|---|---|
| *H04L 41/0659* | (2022.01) |
| *H04L 41/0686* | (2022.01) |
| *H04L 12/28* | (2006.01) |
| *H04L 12/10* | (2006.01) |
| *H04L 12/12* | (2006.01) |
| *H04M 11/06* | (2006.01) |

(52) U.S. Cl.
CPC .......... *H04L 41/0661* (2023.05); *H04L 12/10* (2013.01); *H04L 12/12* (2013.01); *H04L 12/2898* (2013.01); *H04L 41/0686* (2013.01); *H04M 11/06* (2013.01); *H04M 11/066* (2013.01)

(58) Field of Classification Search
CPC .............. G06F 1/3206; G06F 11/1471; G06F 11/2023; G06F 11/1417; G06F 21/74; G06F 9/4403; G06F 21/52
See application file for complete search history.

(56) References Cited

U.S. PATENT DOCUMENTS

| | | |
|---|---|---|
| 7,536,594 B2 | 5/2009 | Schaff et al. |
| 8,117,252 B2 | 2/2012 | Schaff |
| 8,365,018 B2 | 1/2013 | McIntosh et al. |
| | (Continued) | |

*Primary Examiner* — Wutchung Chu
*Assistant Examiner* — Najeeb Ansari
(74) *Attorney, Agent, or Firm* — Seed Intellectual Property Law Group, LLP

(57) ABSTRACT

A method includes determining that data out of a peripheral device has been interrupted. In response, control signals are transmitted that cause power to not be supplied to the peripheral device and then cause power to be supplied to the peripheral device. If the peripheral device is determined to not be outputting data, whether data into the peripheral device has been restored is determined. If it is not, control signals are transmitted that cause power to not be supplied to a router and then cause power to be supplied to the router. If the router is determined to be outputting data, control signals are transmitted that cause power to not be supplied to a wireless access point that is coupled to the modem and then cause power to be supplied to the wireless access point. Whether the wireless access point is outputting data is determined.

20 Claims, 6 Drawing Sheets

(56) References Cited

U.S. PATENT DOCUMENTS

| | | |
|---|---|---|
| 8,886,809 B2 | 11/2014 | Nass |
| 9,792,188 B2 | 10/2017 | Shen et al. |
| 2005/0018655 A1 | 1/2005 | Bianchi et al. |
| 2007/0005759 A1 | 1/2007 | Schaff et al. |
| 2007/0124608 A1 | 5/2007 | Knowlson et al. |
| 2009/0013210 A1* | 1/2009 | McIntosh ............ H04L 41/0661 |
| | | 714/E11.113 |
| 2012/0260076 A1 | 10/2012 | Liu et al. |
| 2012/0278654 A1 | 11/2012 | Shen et al. |
| 2015/0019025 A1 | 1/2015 | Nass |
| 2017/0180224 A1 | 6/2017 | Yeo |
| 2018/0054347 A1 | 2/2018 | Kojima |
| 2019/0053077 A1* | 2/2019 | Ferro .................. H04L 41/0654 |
| 2019/0121410 A1 | 4/2019 | Chan et al. |

* cited by examiner

BROADBAND WATCHDOG

BACKGROUND

Technical Field

The present disclosure relates to communication systems, and more particularly to restoration of services provided by a wide area network access system.

Description of the Related Art

As more homes become automated, users rely on their home broadband connection to always be active. A control or monitoring ability into the home can become lost in the event that a user's broadband connection becomes inactive due to instability, lockup, or signal loss of a modem/gateway or router. For example, the user may lose the ability to control and/or monitor critical items such as cameras, alarms, and thermostats. In many cases, a power cycle will reset the system and solve the connection problem.

There are a number of prior patents in the general field of restoring the signal output from home system if the signal fails. The prior patents include the following: U.S. Pat. No. 7,536,594 to Schaff et al.; U.S. Pat. No. 8,117,252 to Schaff et al.; U.S. Pat. No. 8,365,018 to McIntosh et al.; U.S. Pat. No. 8,886,809 to Nass; U.S. Patent Application Publication No. 2007/0005759 by Schaff et al.; U.S. Patent Application Publication No. 2007/0124608 by Knowlson et al.; and U.S. Patent Application Publication No. 2012/0278654 by Shen et al.

While each of these discusses various techniques to attempt to restore an output signal from a device, none of them provide a solution for a complete system that includes an entire home and all the network connections therein.

BRIEF SUMMARY

A network watchdog and reset device automatically cycles power to a modem/gateway and router in an attempt to restore a broadband connection. The network watchdog and reset device provides switchable power to the modem/gateway and router in a user's home. It is also connected to the Internet through these devices and looks for a good broadband connection on an adjustable time interval. Whenever it is determined that there is no broadband connection available for longer than a defined interval, the network watchdog and reset device disables the power to these devices for a short time, then re-enables the power, effectively rebooting the devices.

A method may be summarized as including: determining that a signal into a modem device has been interrupted; after determining that the signal into the modem device has been interrupted, determining that the signal into the modem device has been restored; in response to determining that the signal into the modem device has been restored, transmitting a first control signal and then transmitting a second control signal, the first control signal causing power to not be supplied to the modem device and the second control signal causing power to be supplied to the modem device; a first predetermined delay period after the transmitting of the second control signal, determining whether the modem device is outputting data; in response to determining that the modem device is outputting data, transmitting a third control signal and then transmitting a fourth control signal, the third control signal causing power to not be supplied to a router device that is coupled to the modem device and the fourth control signal causing power to be supplied to the router device; a second predetermined delay period after the transmitting of the fourth control signal, determining whether the router device is outputting data; and in response to determining that the router device is outputting data, transmitting a fifth control signal and then transmitting a sixth control, the fifth control signal causing power to not be supplied to a wireless access point device that is coupled to the router device and the sixth control signal causing power to be supplied to the wireless access point device; a third predetermined delay period after the transmitting of the sixth control signal, determining whether the wireless access point device is outputting data; in response to determining that the wireless access point device is outputting data, transmitting a seventh control signal and then transmitting an eighth control signal, the seventh control signal causing power to not be supplied to a peripheral device communicatively coupled to the modem and the eighth control signal causing power to be supplied to the peripheral device; and a fourth predetermined delay period after the transmitting of the eighth control signal, determining whether the peripheral device is outputting data.

The method may further include: in response to determining that the wireless access point device is outputting data, transmitting a seventh control signal to the modem, the seventh control signal causing the peripheral device to restart at least one process; and a fourth predetermined delay period after the transmitting of the seventh control signal, determining whether the peripheral device is outputting data.

The method may further include: in response to determining that the peripheral device is not outputting data, transmitting an eighth control signal and then transmitting a ninth control signal, the eighth control signal causing power to not be supplied to the peripheral device and the ninth control signal causing power to be supplied to the peripheral device; and a fifth predetermined delay period after the transmitting of the ninth control signal, determining whether the peripheral device is outputting data.

The fifth predetermined delay period may be greater than the fourth predetermined delay period.

The method may further include: determining that data into the modem device has not been interrupted; in response to determining that data into the modem device has not been interrupted, determining whether data out of the modem has been interrupted; and in response to determining that data out of the modem has not been interrupted, determining whether data out of a peripheral device communicatively coupled to the modem has been interrupted.

The method may further include: in response to the determining that data out of the peripheral device has been interrupted, transmitting a seventh control signal and then transmitting an eighth control signal, the seventh control signal causing power to not be supplied to the peripheral device and the eighth control signal causing power to be supplied to the peripheral device; and a fourth predetermined delay period after the transmitting of the eighth control signal, determining whether the peripheral device is outputting data.

The method may further include: in response to the determining that data out of the peripheral device has been interrupted, transmitting a seventh control signal to the peripheral device, the seventh control signal causing the peripheral device to restart at least one process; and a fourth predetermined delay period after the transmitting of the seventh control signal, determining whether the peripheral device is outputting data.

The method may further include: in response to determining that the peripheral device is not outputting data, transmitting an eighth control signal and then transmitting a ninth control signal, the eighth control signal causing power to not be supplied to a peripheral device and the ninth control signal causing power to be supplied to the peripheral device; and a fifth predetermined delay period after the transmitting of the ninth control signal, determining whether the peripheral device is outputting data.

The method may further include selecting the peripheral device from among a plurality of peripheral devices communicatively coupled to the modem device based on a plurality of priorities associated with the plurality of peripheral devices.

The method may further include: transmitting to a set-top box a message indicating that a network interruption has been detected; and outputting from the set-top to a display device a video signal including the message.

The method may further include displaying the message indicating that the network interruption has been detected.

The method may further include determining that a data signal out of a peripheral device has terminated.

A method may be summarized as including: determining that data out of a peripheral device has been interrupted; in response to determining that the data out of the peripheral device has been interrupted, transmitting a first control signal and then transmitting a second control signal, the first control signal causing power to not be supplied to the peripheral device and the second control signal causing power to be supplied to the peripheral device; a first predetermined delay period after the transmitting of the second control signal, determining whether the peripheral device is outputting data; in response to determining that the peripheral device is not outputting data, determining whether data into the peripheral device has been restored; after determining that the data into the peripheral device has not been restored, transmitting a third control signal and then transmitting a fourth control signal, the third control signal causing power to not be supplied to a router device and the fourth control signal causing power to be supplied to the router device; a second predetermined delay period after the transmitting of the fourth control signal, determining whether the router device is outputting data; in response to determining that the router device is outputting data, transmitting a fifth control signal and then transmitting a sixth control signal, the fifth control signal causing power to not be supplied to a wireless access point device that is coupled to the modem device and the sixth control signal causing power to be supplied to the wireless access point device; and a third predetermined delay period after the transmitting of the sixth control signal, determining whether the wireless access point device is outputting data.

The method may further include: in response to determining that the wireless access point device is outputting data, transmitting a seventh control signal and then transmitting an eighth control, the seventh control signal causing power to not be supplied to the peripheral device and the eighth control signal causing power to be supplied to the peripheral device; and a fourth predetermined delay period after the transmitting of the eighth control signal, determining whether the peripheral device is outputting data.

The method may further include: in response to determining that the peripheral device is outputting data, determining whether there is another peripheral device; in response to determining that there is another peripheral device, determining that data out of the other peripheral device has been interrupted; in response to determining that the data out of the other peripheral device has been interrupted, transmitting a ninth control signal and then transmitting a tenth control signal, the ninth control signal causing power to not be supplied to the other peripheral device and the tenth control signal causing power to be supplied to the other peripheral device; a fifth predetermined delay period after the transmitting of the tenth control signal, determining whether the other peripheral device is outputting data.

The method may further include: transmitting to a set-top box a first message, the first message indicating that a problem with the peripheral device has been detected; and outputting from the set-top to a display device a video signal including the first message indicating that the problem with the peripheral device has been detected.

The method may further include: transmitting to the set-top box a second message, the second message indicating that the problem with the peripheral device has been resolved; outputting from the set-top to the display device a video signal including the second message indicating that the problem with the peripheral device has been resolved.

The method may further include: displaying the first message indicating that the problem with the peripheral device has been detected; and displaying the second message indicating that the problem with the peripheral device has been resolved.

The first message may include at least one of: a location of the peripheral device and a type of the peripheral device. The first predetermined delay period, the second predetermined delay period, and the third predetermined delay period may be different.

DETAILED DESCRIPTION

Figure 1:
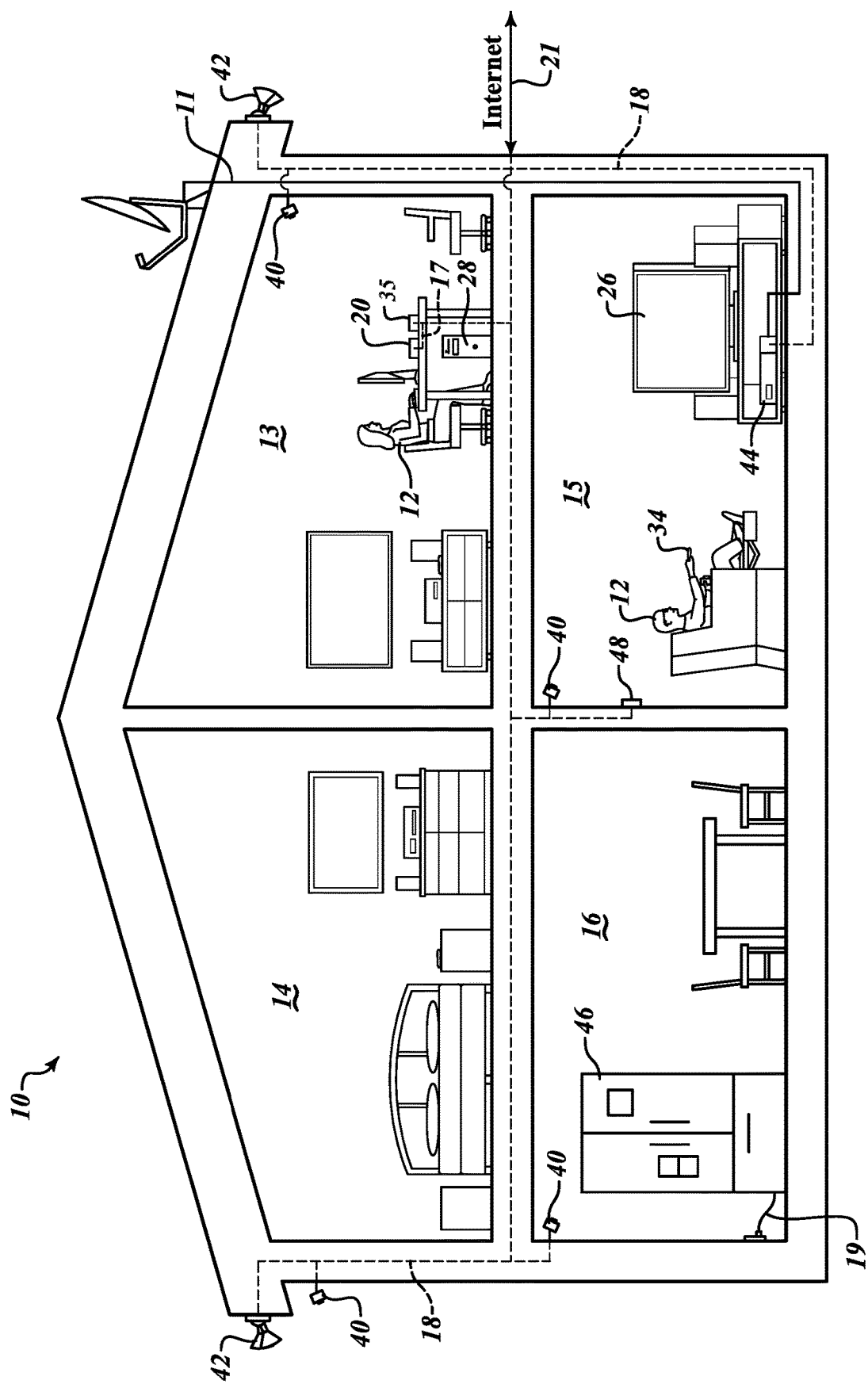
FIG. 1 is a diagram of a building in which a network watchdog and reset device is used, according to one or more embodiments of the present disclosure.

FIG. 1 is a diagram of a house 10 in which a network watchdog and reset device 35 is used, according to one or more embodiments of the present disclosure. The house 10 includes a home office 13, a bed room 14, a living room 15, and a kitchen 16. The office 13 includes a wide area network access system 20 and the network watchdog and reset device 35 (sometimes called watchdog 35 herein), which are coupled together by one or more wires or cables 17 or by a wireless connection from wireless access point 24 (see FIG. 2).

There are a number of peripheral devices connected to the wide area network system 20, as will now be explained and which are set forth in more detail in FIGS. 2 and 3. The living room 15 includes a television 26 that is coupled to a set-top box 44, which is a television receiver that is coupled via a cable 11 to a satellite antenna located on the roof of the house 10. In one or more embodiments, the set-top box 44 includes a network interface that communicates with other devices in the house 10 over a local area network (LAN), which may be a wired LAN or wireless LAN (WLAN). A user 12 can operate a remote control 34 to control the television 26 and the set-top box 44.

Four security cameras 40 are located throughout the house 10. More particularly, a first security camera 40 is located in the home office 12, a second security camera 40 is located in the living room 15, a third second security camera 40 is located in the kitchen 16, and a fourth security camera 40 is mounted to an upper portion of the outside of the house 10 near the bedroom 14. A first security light 42 is mounted to the upper portion of the outside of the house 10 near the bedroom 14, and a second security light 42 is mounted to the opposite side of the upper portion of the outside of the house 10.

In one or more embodiments, each security camera 40 includes a wireless receiver that receives commands from an application running on the computer 28, the network watchdog and reset device 35, and/or the cell phone 38. Additionally, each security camera 40 includes a wireless transmitter that transmits requested video data and status information to the application running on the computer 28, the network watchdog and reset device 35, and/or the cell phone 38.

In one or more embodiments, the security cameras 40, the security lights 42, the set-top box 44, and the thermostat 48 are interconnected via a wireless local area network 18. The wireless local area network 18 is provided by a wireless access point device 24 or a wireless access point device 33 (see FIG. 2), for example.

A smart thermostat 48 also is located in the living room 15. In one or more embodiments, the smart thermostat 48 includes a wireless receiver that receives commands from an application running on a computer 28, the network watchdog and reset device 35, and/or a cell phone 38. Additionally, the smart thermostat 48 may include a wireless transmitter that transmits requested status information to the application running on the computer 28, the network watchdog and reset device 35, and/or a cell phone 38 (shown in FIG. 2).

Figure 2:
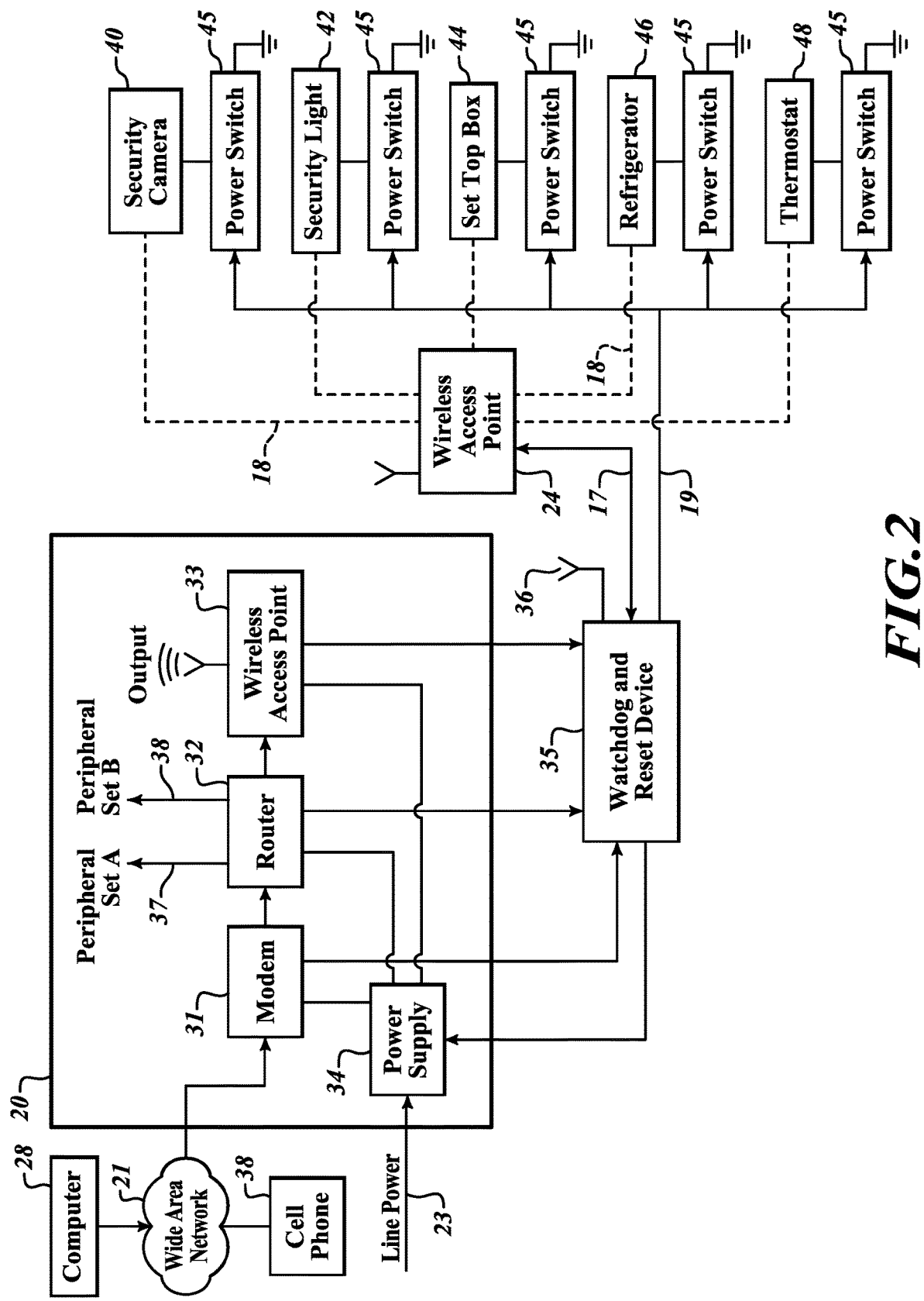
FIG. 2 is a block diagram showing a network watchdog and reset device in use, according to one or more embodiments of the present disclosure.

FIG. 2 is a block diagram showing a network watchdog and reset device 35 in use, according to one or more embodiments of the present disclosure. As mentioned above, the network watchdog and reset device 35 is coupled to a wide area network access system 20, which includes a modem device 31, a router device 32, and a wireless access point device 33. The modem device 31 is coupled by one or more wires or cables (not shown) to a wide area network 21, which is provided by an Internet service provider, for example. The router device 32 routes data included in frames among the Ethernet ports based on source and destination addresses included in the frames. Accordingly, the modem device 31, and devices connected thereto, such as the wireless access point device 33, for example, can transmit data to and receive data from the Internet via the wide area network 21.

The modem device 31, the router device 32, and the wireless access point device 33 are plugged into and/or receive power from a power supply device 34, which is coupled to an electrical power line 23 through which mains power is provided to the house 10. The network watchdog and reset device 35 is coupled to the power supply device 34. In one or more embodiments, the power supply device 34 is included in the network watchdog and reset device 35. In one or more embodiments, the power supply device 34 is a power strip that is remotely controlled by the wireless access point device 33. For example, the network watchdog and reset device 35 is coupled to the power supply device 34 by a Universal Serial Bus (USB) cable, and the network watchdog and reset device 35 sends command signals via the USB cable to the power supply device 34 that cause one or more of the outlets of the power strip to be selectively connected to power provided by the power line 23. In one or more embodiments, the power supply device 34 is wirelessly coupled to the watchdog and reset device 35, which transmits wireless control signals to the power supply device 34 that cause one or more of the outlets of the power strip to be selectively connected to power provided by the power line 23. For example, the watchdog and reset device 35 transmits control signals to the power supply device 34 according to Z-Wave (registered trademark), Bluetooth (registered trademark), or IEEE 801.11 AC communications specifications.

In one or more embodiments, the network watchdog and reset device 35 is connected to the modem device 31, the router device 32, and the wireless access point device 33 using a plurality of wires or cables, or by a wireless signal from the wireless access point 24. In one or more embodiments, the modem device 31, the router device 32, and the wireless access point device 33 are implemented as integrated circuits that are included in the network watchdog and reset device 35. In one or more embodiments, the modem device 31, the router device 32, the wireless access point device 33, and the power supply device 34 are all included in the same circuit with the network watchdog and reset device 35. Namely, the wide area network system 20 may also include the network watchdog and reset device 35 with the other components shown in FIGS. 2 and 3.

The network watchdog and reset device 35 and the plurality of peripheral devices are interconnected via the wireless local area network 18. The peripheral devices include the security cameras 40, the security lights 42, the set-top box 44, the refrigerator 46, and the thermostat 48. There are many other peripheral devices connected to the system 20 than those listed and not all are shown because they might be very numerous. The peripheral devices might include any number of printers, audio systems, light control systems, movie rooms, media devices, computers and many others as is known in the art. In one or more embodiments, the router device 32 includes a plurality of Ethernet ports that are coupled via Ethernet cables to the modem device 31, the access point 33, and respective ones of the peripheral devices.

The router 32 may control peripherals in selected groups A and B via cables 37 and 39. The splitting of the peripherals into specific groups permits a greater range of control and faster reset of entire groups. There are often so many peripheral devices that controlling them in groups such as sets A, B, C, D, etc., can greatly speed up the reset process. The sets A, B, etc., are selected based on logic groupings. For example, set A can be all peripheral devices that run on battery power and set B can be all that peripheral devices that run on wall outlet power. Or, set A can be all household devices, such as thermostats, lights, refrigerators, etc., and set B and be all devices with a CPU that are part of the house computer system, such as printers, set-top box 44, portable computers or other processor devices. Set A could be those devices of high importance, such as those related to home security, such as security lights 42 or security camera 40, while those in set B might be those convenience devices, such as speakers, multimedia players, printers, and the like. The ability to use the router 32 to control the internet signal and power to large groups of peripherals in sets A, B, etc., provides significant benefits for fast recovery of a system that has gone down.

In one or more embodiments, the wireless access point device 33 provides the wireless network 18, and the wireless access point 24 functions as a range extender for the wireless network 18. The wireless access point device 33 and the wireless access point 24 route data included in frames based on source and destination addresses included in the frames. Many homes have two or more wireless access points.

The peripheral devices are coupled to power switches 45 that selectively provide power from the power line 23 to respective ones of the peripheral devices depending on respective states (i.e., on or off) of the power switches 45. In one or more embodiments, one or more of the power switches 45 is included in a smart power outlet provided in a wall of the house 10. The power switches 45 can each be a smart plug that plugs into a power outlet provided in a wall of the house 10. In one or more embodiments, the network watchdog and reset device 35 includes an antenna 36 through which it wirelessly communicates with the power switches 45 to turn them on or off; or they can be connected by cables.

The network watchdog and reset device 35 generates control signals that include addresses of respective ones of the power switches 45. The control signals contains predetermined codes, bit patterns, or values that causes the power switches 45 to turn on or turn off. While a power switch 45 is turned on, it provides power from the power line 23 to the peripheral device connected thereto. While the power switch 45 is turned off, it does not provide power from the power line 23 to the peripheral device connected thereto. The network watchdog and reset device 35 can communicate with the power switches 45 regardless of whether they are turned on or off. For example, each of the power switches 45 includes a wireless receiver that remains operational regardless of the whether the power switches 45 are turned on or off.

The network watchdog and reset device 35 can selectively restart a peripheral device by transmitting a first control signal to an individual power switch 45 that causes that particular power switch 45 to not provide power to the peripheral device coupled thereto, waiting a predetermined amount of time, and then transmitting a second control signal to the power switch 45 that causes the power switch 45 to provide power to the peripheral device coupled thereto. Additionally or alternatively, the network watchdog and reset device 35 can selectively restart any peripheral device by transmitting to the peripheral device a control signal including a command that, when processed by the peripheral device, cause the peripheral device to turn itself off or to reboot or restart a predetermined application or process executing on the peripheral device.

The network watchdog and reset device 35 determines whether each particular peripheral device is outputting data in a manner indicating that the peripheral device is functioning properly. The network watchdog and reset device 35 may listen for an output, data line, activity monitor or address that is associated with the peripheral device and is included in frames generated by the peripheral device in order to determine whether the peripheral device is functioning properly.

Each peripheral device will have particular output of data or activity function that is unique to that peripheral that the network watchdog and reset device 35 can monitor. For example, a camera should be putting out video data, a set-top box should be sending an audiovisual (A/V) signal to drive a display and speakers, household convenience items like a thermostat, refrigerator, freezer, security lights, etc., should be reporting their status on a network that might include temperature, on/off time, etc. The network watchdog and reset device 35 will review the data output from each device to confirm it is outputting an expected data signal on the expected schedule. The schedule at which each peripheral is expected to report and the type of data expected are stored in the memory of the network watchdog and reset device 35. The watchdog 35 will listen to all the data being output on the network and monitor the data from each individual peripheral device.

If a peripheral device stops outputting the expected data, either because it stopped outputting the data completely or it was outputting some data, but the type or quantity of data was not within the expected parameters for a properly operating peripheral device, then the watch dog 35 may decide to do a hard rest of the device itself and/or the electronics that control the network connection into it and out of it. A hard reset is comprised of turning off the power completely to the device, waiting a settling period, and then turning the power back on. The settling period may be different for each device based on the time it takes to fully power down, and the time needed for local internal capacitances to dissipate.

The items turned off can be the entire peripheral device, for example, turn off the refrigerator, the entire furnace system, the security lights, the entire NV system, the set-top box, etc., or it can be just the electronic control part of the system for that peripheral device. For example, assume the peripheral device is the refrigerator. The power off signal in one embodiment is to the entire refrigerator, which would turn off, and then back on the motor, lights, fans, electronics, etc. In a second embodiment, the turn off signal is just to the electronic control circuits that have the network input and network output signal lines. The second embodiment will save the trouble of having to fully turn off and restart a large complex system with many parts, such as the entire heating and cooling system of home or large business. If turning off just the control box for a particular peripheral device does not work to provide a reset of the output signal, then the entire system can be turned off as a second step attempt in one embodiment as well.

The watchdog 35 may begin listening a predetermined amount of time after the network watchdog and reset device 35 has transmitted the second control signal the causes the power switch 45 to restore power to the peripheral device. The predetermined amount of time may vary depending on the type of peripheral device. For example, the security camera 40 may take a longer time to restart or reboot than the security light 40. Accordingly, the network watchdog and reset device 35 may wait longer to begin listening for traffic from the security camera 40 than for the security light 40. In one or more embodiments, a memory of the network watchdog and reset device 35 stores a table or other suitable data structure that associates various predetermined amounts of time with identifiers of respective ones of the peripheral devices.

The network watchdog and reset device 35 may passively listen for traffic from peripheral devices by monitoring data traffic that is broadcast on a local area network and determining whether any of the traffic has a source address that is associated with a particular peripheral device. The source address may be a media access control address (MAC address), such as an Ethernet address, an Internet Protocol (IP) address, or an application specific address or port, for example.

The network watchdog and reset device 35 may actively request data from a peripheral device by transmitting a request for data to the peripheral device, which is processed by an application running on the peripheral device. For example, the network watchdog and reset device 35 may transmit a request for video data to an application running on the security camera 42, and then listen for data packets that include the video data. By way of another example, the network watchdog and reset device 35 may "ping" a peripheral device in order to determine whether the peripheral device is outputting data. A "ping" as used herein may include the network watchdog and reset device 35 transmitting an Internet Control Message Protocol (ICMP) Echo_Request message to the peripheral device, and then listening for an ICMP Echo_Response message from the peripheral device. If the network watchdog and reset device 35 receives the ICMP Echo_Response message from the peripheral device it may determine that the peripheral device is outputting data.

Figure 3:
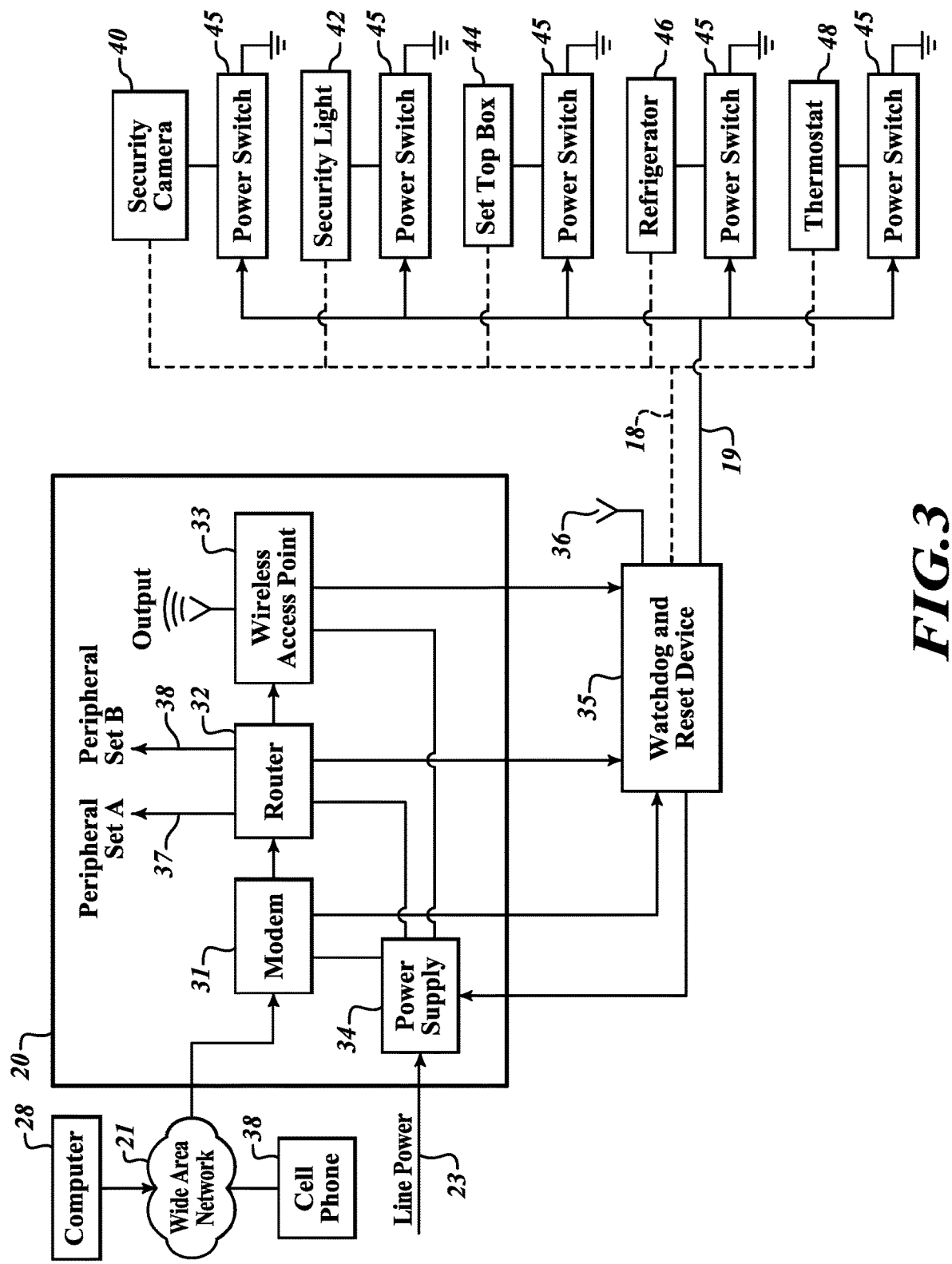
FIG. 3 is a block diagram showing a network watchdog and reset device in use, according to one or more embodiments of the present disclosure.

FIG. 3 is a block diagram showing a network watchdog and reset device in use, according to one or more embodiments of the present disclosure. FIG. 3 is similar in many relevant respects to FIG. 2, except that the functionality of the wireless access point device 24 shown in FIG. 2 is provided by the network watchdog and reset device 35.

Figure 4:
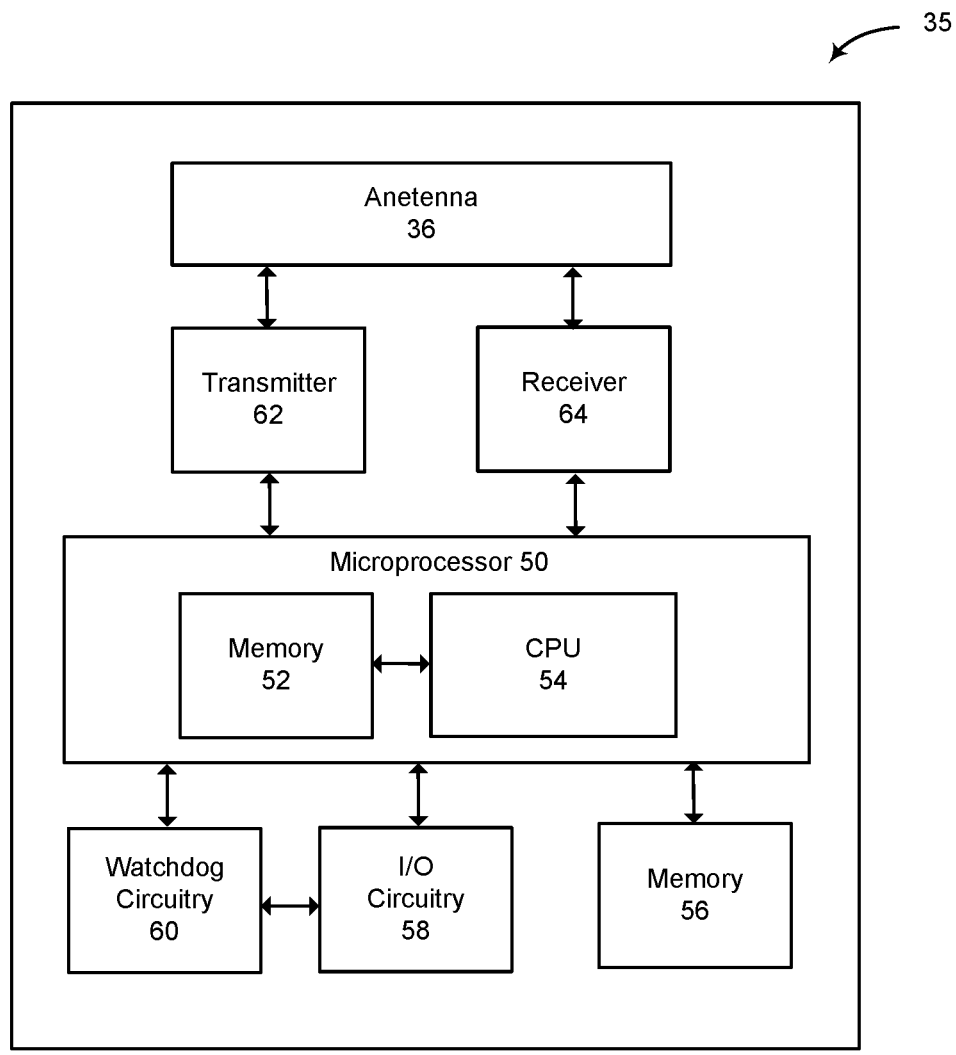
FIG. 4 is a block diagram of a network watchdog and reset device, according to one or more embodiments of the present disclosure.

FIG. 4 is a block diagram of a network watchdog and reset device 35, according to one or more embodiments of the present disclosure. The network watchdog and reset device 35 includes a microprocessor 50 having a memory 52 and a central processing unit (CPU) 54, a memory 56, input/output (I/O) circuitry 58, watchdog circuitry 60, a transmitter 62, a receiver 64, and an antenna 36.

The memory 56 stores processor-executable instructions that, when executed by the CPU 54, cause the network watchdog and reset device 35 to perform the functions described herein. The CPU 54 uses the memory 52 as a working memory while executing the instructions. In one or more embodiments, the memory 52 is comprised of one or more random access memory (RAM) modules. In one or more embodiments, the memory 56 is comprised of one or more non-volatile random access memory (NVRAM) modules, such as electronically erasable programmable read-only memory (EEPROM) or Flash memory modules, for example.

In one or more embodiments, the I/O circuitry 58 may include buttons, switches, dials, knobs, a touchscreen, or other user-interface elements for inputting commands to the network watchdog and reset device 35. The I/O circuitry 58 also may include a speaker, one or more light emitting devices, or other user-interface elements for outputting information or indications from the network watchdog and reset device 35. The I/O circuitry 58 includes one or more data interfaces, for example, a connection terminal that connects to an Ethernet cable, a connection terminal that connects to a USB cable, a connection terminal that connects to a coaxial cable, a connection terminal that connects to a standard subscriber telephone line, etc.

In one embodiment, the watchdog circuitry 60 includes a detector and outputs a signal to the microprocessor 50 when the detector detects a carrier signal of a predetermined frequency. The watchdog circuitry 60 includes a demodulator and outputs a signal to the microprocessor 50 when the demodulator detects valid data. For example, the microprocessor 50 processes data and compares a computed checksum value to a checksum value received from the wide area network 21. The microprocessor 50 may store timestamps indicating times when the signal from the watchdog circuitry 60 and/or valid data is not received.

For example, in one embodiment, the watchdog circuitry 60 includes a detector and outputs a signal to the microprocessor 50 when the detector does not detect a carrier signal of a predetermined frequency for a predetermined amount of time. The microprocessor 50 may store timestamps indicating times when the signal from the watchdog circuitry 60 is received. The watchdog circuitry 60 includes a demodulator and outputs a signal including demodulated data to the microprocessor 50. The microprocessor 50 may compute a checksum value using the received data, compare the computed checksum value to a checksum value received from the wide area network 21, and store timestamps indicating times when the valid data is not received from the wide area network 21.

In one or more embodiments, the transmitter 62 and receiver 64 are configured to transmit and receive radio frequency (RF) signals in accordance with the Bluetooth (registered trademark), Z-wave (registered trademark), or IEEE 802.11 AC communication standards. In one or more embodiments, the network watchdog and reset device 35 includes a plurality of pairs of transmitters 62 and receivers 64, wherein each pair is configured to transmit and receive RF signals in accordance with one or more of the Bluetooth (registered trademark), Z-wave (registered trademark), IEEE 802.11 AC communication standards, and a cellular communication standard (e.g., 4G LTE), respectively.

Figure 5:
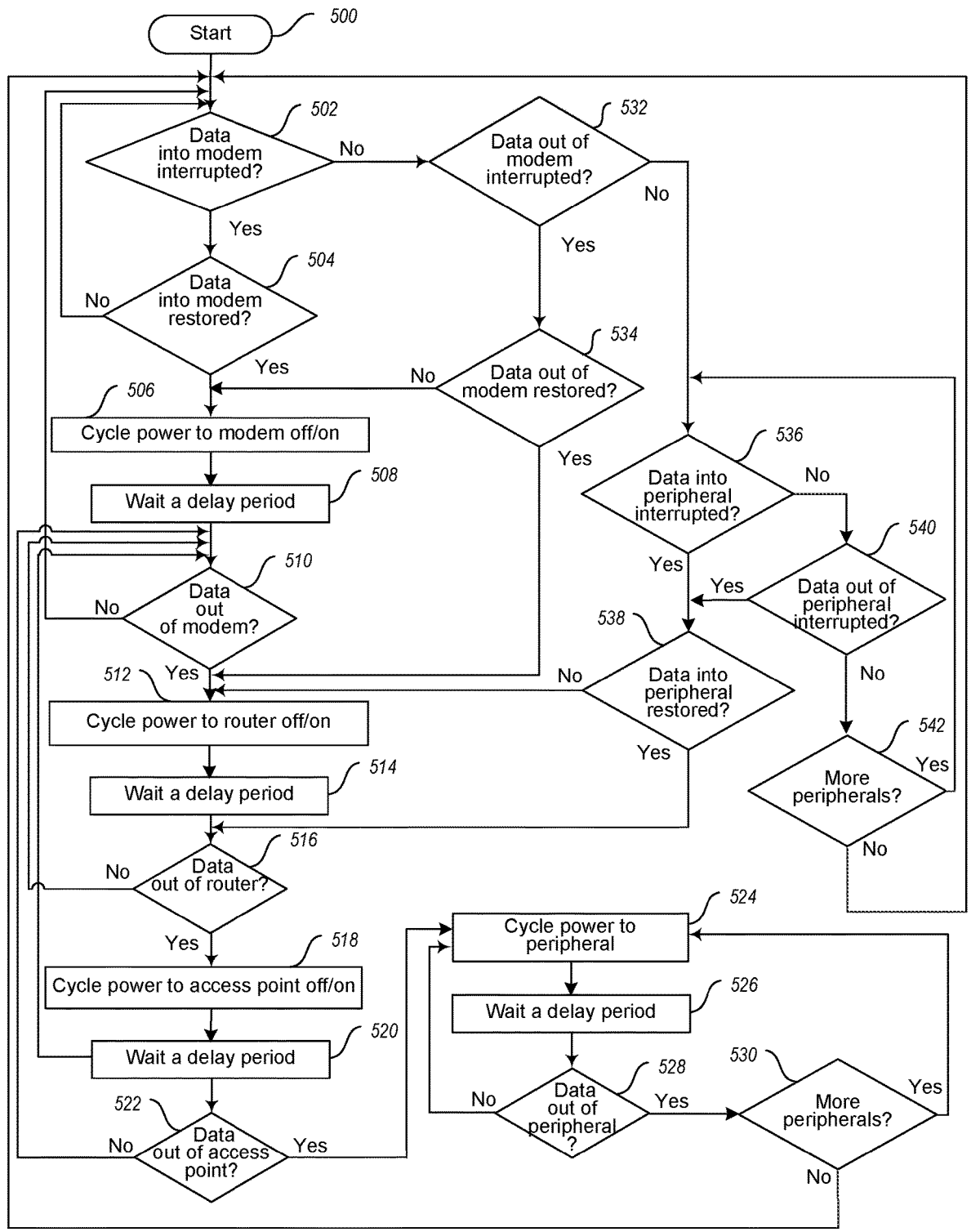
FIG. 5 is a flowchart of a method performed by a network watchdog and reset device, according to one or more embodiments of the present disclosure.

FIG. 5 is a flowchart of a method performed by a network watchdog and reset device 35, according to one or more embodiments of the present disclosure. For example, the memory 56 stores instructions that, when executed by the microprocessor 50, cause the network watchdog and reset device 35 to perform the method shown in FIG. 5. The method begins at 500, for example, when the network watchdog and reset device 35 is powered on.

At 502, the network watchdog and reset device 35 determines whether data into the modem device 31 has been interrupted. In one or more embodiments, the I/O circuitry 58 of the network watchdog and reset device 35 includes a first coaxial cable connection terminal, which is connected via a coaxial cable to the wide area network 21, and a second coaxial cable connection terminal, which is connected to an input of the modem device 31. The watchdog circuitry 60 passes a signal received via the first coaxial cable connection terminal to the second coaxial cable connection terminal. The watchdog circuitry 60 also monitors a carrier signal received from the wide area network 21 via the first coaxial cable connection terminal at 502, and outputs a control signal to the microprocessor 50 when the signal level of the carrier signal falls below a predetermined threshold signal level value for more than a predetermined amount of time. If the microprocessor 50 receives the control signal from the watchdog circuitry 60, the network watchdog and reset device 35 determines at 502 that data into the modem device 31 has been interrupted. If the microprocessor 50 does not receive the control signal from the watchdog circuitry 60, the network watchdog and reset device 35 does not determine at 502 that data into the modem device 31 has been interrupted.

In one or more embodiments, the I/O circuitry 58 of the network watchdog and reset device 35 includes a USB port that is coupled to a USB port of the modem device 31 via a USB cable. The memory 56 of the network watchdog and reset device 35 stores instructions that, when executed by the microprocessor 50, cause the network watchdog and reset device 35 to communicate with the with a web server provided by the modem device 31 at 502. More particularly, the instructions cause the microprocessor 50 to issue to the server provided by the modem device 31 Hypertext Transfer Protocol (HTTP) commands that cause the web server to output log data to the network watchdog and reset device 35. The instructions also cause the microprocessor 50 to perform a text search on the log data to determine whether one or more predetermined words or phrases indicating that data into the modem 31 has been interrupted since the last time the network watchdog and reset device 35 checked the log data. If the one or more of the predetermined words or phrases are found, the network watchdog and reset device 35 determines at 502 that data into the modem device 31 has been interrupted. If the one or more of the predetermined words or phrases are not found, the network watchdog and reset device 35 determines at 502 that data into the modem device 31 has not been interrupted.

In one or more embodiments, if the network watchdog and reset device 35 determines at 502 that data into the modem device 31 has been interrupted, the watchdog and reset device 35 transmits to the set-top box 44 a command or message which, when processed by the set-top box 44, causes the set-top box 44 to output to the television 26 a video signal including a message indicating that an interruption of data into to the modem device 31 has been detected. When the television 26 displays the message, the user 12 is informed that a network problem has been detected and is being addressed by the network watchdog and reset device 35. Additionally or alternatively, the watchdog and reset device 35 may transmit to the computer 28 a command or message which, when processed by the computer 28, causes the computer 28 to output to a display device a video signal including the message indicating that an interruption of data into to the modem device 31 has been detected, or that a network interruption has been detected.

If the network watchdog and reset device 35 determines at 502 that data into the modem device 31 has been interrupted, the method proceeds to 504. If the network watchdog and reset device 35 determines at 502 that data into the modem device 31 has not been interrupted, the method proceeds to 532.

At 504, the network watchdog and reset device 35 determines whether data into the modem device 31 has been restored. In one or more embodiments, the network watchdog and reset device 35 determines that data into the modem device 31 has been restored if the watchdog circuitry 60 is no longer outputting the control signal indicating the carrier signal from the wide area network 21 is not detected. Additionally, the network watchdog and reset device 35 determines that data into the modem device 31 has not been restored if the watchdog circuitry 60 is still outputting the control signal indicating the carrier signal from the wide area network 21 is not detected.

In one or more embodiments, the network watchdog and reset device 35 determines at 504 that data into the modem device 31 has been restored if the log data from the web server provided by the modem 31 includes one or more predetermined words or phrases that indicate that data is being received from the wide area network 21. Additionally, the network watchdog and reset device 35 determines at 504 that data into the modem device 31 has not been restored if the log data from the web server provided by the modem 31 does not include the one or more predetermined words or phrases that indicate that data is being received from the wide area network 21.

If the network watchdog and reset device 35 determines at 504 that data into the modem device 31 has been restored, the method proceeds to 506. If the network watchdog and reset device 35 determines at 504 that data into the modem device 31 has not been restored, the method returns to 502.

At 506, the network watchdog and reset device 35 cycles power to the modem device 31. In one or more embodiments, at 506, the network watchdog and reset device 35 transmits a first control signal to the power supply 34, which causes the power supply 34 to stop supplying power from the power line 23 to the modem device 31, and then transmits a second control signal to the power supply 34, which causes the power supply 34 to resume supplying power from the power line 23 to the modem device 31. Additionally or alternatively, in one or more embodiments, at 506, the network watchdog and reset device 35 transmits to the modem device 31 a command that, when processed by the modem device 31, causes the modem device 31 to reboot or restart a predetermined application or process running on the modem device 31. The process then proceeds to 508.

At 508, the network watchdog and reset device 35 waits for a predetermined delay period. In one or more embodiments, the memory 56 of the network watchdog and reset device 35 stores a value for the predetermined delay period, which the microprocessor 50 uses. For example, the microprocessor 50 adds the value of the predetermined delay period to a current time value and waits for a value of time output from a clock to reach the resulting value before taking further actions. The predetermined delay period is selected to ensure that the modem device 31 has sufficient time to finish going through a startup procedure and begin normal operation before the network watchdog and reset device 35 take further actions. The process then proceeds to 510.

At 510, the network watchdog and reset device 35 determines whether the modem device 31 is outputting data. In one or more embodiments, at 510, the network watchdog and reset device 35 pings a local IP address of the modem device 31, as described above. Additionally or alternatively, at 510, the network watchdog and reset device 35 pings a network address of a device on the Internet. If the network watchdog and reset device 35 receives a response to one or more of the pings, the network watchdog and reset device 35 determines at 510 that the modem device 31 is outputting data. If the network watchdog and reset device 35 does not receive a response to the pings, the network watchdog and reset device 35 determines at 510 that the modem 31 is not outputting data.

If the network watchdog and reset device 35 determines at 510 that the modem device 31 is outputting data, the method proceeds to 512. If the network watchdog and reset device 35 determines at 510 that the modem device 31 is not outputting data, the method returns to 510.

At 512, the network watchdog and reset device 35 cycles power to the router device 32. In one or more embodiments, at 512, the network watchdog and reset device 35 transmits a first control signal to the power supply 34, which causes the power supply 34 to stop supplying power from the power line 23 to the router device 32, and then transmits a second control signal to the power supply 34, which causes the power supply 34 to resume supplying power from the power line 23 to the router device 32. Additionally or alternatively, in one or more embodiments, at 512, the network watchdog and reset device 35 transmits to the router device 32 a command that, when processed by the router device 32, causes the router device 32 to reboot or restart a predetermined application or process running on the router device 32. The process then proceeds to 514.

At 514, the network watchdog and reset device 35 waits for a predetermined delay period. In one or more embodiments, the memory 56 of the network watchdog and reset device 35 stores a value for the predetermined delay period, which the microprocessor 50 uses. For example, the microprocessor 50 adds the value of the predetermined delay period to a current time value and waits for a value of time output from a clock to reach the resulting value before taking further actions. The predetermined delay period is selected to ensure that the router device 32 has sufficient time to finish going through a startup procedure and begin normal operation before the network watchdog and reset device 35 take further actions. The process then proceeds to 516.

At 516, the network watchdog and reset device 35 determines whether the router device 32 is outputting data. In one or more embodiments, at 516, the network watchdog and reset device 35 pings a local IP address of the router device 32 at 510. Additionally or alternatively, at 516, the network watchdog and reset device 35 may ping a network address of a device on the Internet. If the network watchdog and reset device 35 receives a response to the one or more of the pings, the network watchdog and reset device 35 determines at 516 that the router device 32 is outputting data. If the network watchdog and reset device 35 does not receive a response to the pings, the router device 32 determines at 516 that the router device 32 is not outputting data.

If the network watchdog and reset device 35 determines at 516 that the router device 32 is outputting data, the method proceeds to 518. If the network watchdog and reset device 35 determines at 516 that the router device 32 is not outputting data, the method returns to 510.

At 518, the network watchdog and reset device 35 cycles power to the wireless access point device 33. In one or more embodiments, at 518, the network watchdog and reset device 35 transmits a first control signal to the power supply 34, which causes the power supply 34 to stop supplying power from the power line 23 to the wireless access point device 33, and then transmits a second control signal to the power supply 34, which causes the power supply 34 to resume supplying power from the power line 23 to the wireless access point device 33. Additionally or alternatively, in one or more embodiments, at 518, the network watchdog and reset device 35 transmits to the wireless access point device 33 a command that, when processed by the wireless access point device 33, causes the wireless access point device 33 to reboot or restart a predetermined application or process running on the modem device 31. The process then proceeds to 520.

At 520, the network watchdog and reset device 35 waits for a predetermined delay period. In one or more embodiments, the memory 56 of the network watchdog and reset device 35 stores a value for the predetermined delay period, which the microprocessor 50 uses. For example, the microprocessor 50 adds the value of the predetermined delay period to a current time value and waits for a value of time output from a clock to reach the resulting value before taking further actions. The predetermined delay period is selected to ensure that the wireless access point device 33 has sufficient time to finish going through a startup procedure and begin normal operation before the network watchdog and reset device 35 take further actions. The process then proceeds to 522.

At 522, the network watchdog and reset device 35 determines whether the wireless access point device 33 is outputting data. In one or more embodiments, at 522, the network watchdog and reset device 35 wirelessly pings a local IP address of the wireless access point device 33. Additionally or alternatively, the network watchdog and reset device 35 pings a network address of a device on the Internet at 522. If the network watchdog and reset device 35 receives response to the one or more of the pings, the network watchdog and reset device 35 determines, at 522, that the wireless access point device 33 outputting data. If the network watchdog and reset device 35 does not receive a response to the pings, the router device 32 determines, at 522, that the wireless access point device 33 is not outputting data.

If the network watchdog and reset device 35 determines, at 522, that the network access point device 33 is outputting data, the method proceeds to 524. If the network watchdog and reset device 35 determines, at 522, that the network access point device 33 is not outputting data, the method returns to 510.

At 524, the network watchdog and reset device 35 cycles power to a peripheral device. In one or more embodiments, the memory 56 of the network watchdog and reset device 35 stores a table or other suitable data structure including an identifier of each peripheral device that is associated with one or more of the following: an address of a corresponding one of the power witches 45 to which the peripheral device is attached, an identifier of particular command to be used to restart the peripheral device, a priority value, and an indication of whether the peripheral device has been reset in a most recent network outage event.

By way of example, the security camera 40 in the kitchen 16 may be assigned a highest priority, the security camera 40 in the living room 15 may be assigned a next highest priority, the security camera 40 in the office 13 may be assigned a next highest priority, the security camera 40 mounted outside of the house 10 may be assigned a next highest priority, etc. Accordingly, the microprocessor 50 would first cycle power to the security camera 40 in the kitchen 16, then cycle power to the security camera 40 in the living room 15, then cycle power to the security camera 40 in the office 13, then cycle power to the security camera 40 mounted outside of the house 10, etc.

At 524, the network watchdog and reset device 35 cycles power to a peripheral device. For example, the network watchdog and reset device 35 uses information stored in the memory 56 to select the highest priority peripheral device and then cycles power to that peripheral device. In one or more embodiments, at 524, the network watchdog and reset device 35 transmits a first control signal to a power switch 45, which causes the power switch 45 to stop supplying power from the power line 23 to the peripheral device, and then transmits a second control signal to the power switch 45, which causes the power switch 45 to resume supplying power from the power line 23 to the peripheral device. Additionally or alternatively, in one or more embodiments, at 524, the network watchdog and reset device 35 transmits to the peripheral device a command that, when processed by the peripheral device, causes the peripheral device to reboot or restart a predetermined application or process running on the peripheral device. The process then proceeds to 526.

At 526, the network watchdog and reset device 35 waits for a predetermined delay period. In one or more embodiments, the memory 56 of the network watchdog and reset device 35 stores a value for the predetermined delay period, which the microprocessor 50 uses. For example, the microprocessor 50 adds the value of the predetermined delay period to a current time value and waits for a value of time output from a clock to reach the resulting value before taking further actions. The predetermined delay period is selected to ensure that the peripheral device has sufficient time to finish going through a startup procedure and begin normal operation before the network watchdog and reset device 35 take further actions. In one or more embodiments, if power to a particular peripheral device has been cycled more than a predetermined number of times within a predetermined amount of time, the CPU 54 increases the value for the predetermined delay period stored in the memory 52 for that device. For example, the CPU 54 adds a predetermined amount time to the value for the predetermined delay period previously stored for that device and stores the resulting value as the value for the predetermined delay period for that device in the memory 52. The process then proceeds to 528.

At 528, the network watchdog and reset device 35 determines whether the peripheral device is outputting data. In one or more embodiments, at 528, the network watchdog and reset device 35 wirelessly pings a local IP address of the peripheral device. If the network watchdog and reset device 35 receives response to one or more of the pings, the network watchdog and reset device 35 determines, at 528, that the peripheral device is outputting data. If the network watchdog and reset device 35 does not receive a response to the pings, the router device 32 determines at 528 that the wireless access point device 33 is not outputting data.

Additionally or alternatively, in one or more embodiments, at 528, the network watchdog and reset device 35 transmits to the peripheral device a command that, when processed by the peripheral device, causes the peripheral device to transmit data, for example, to the watchdog and reset device 35. If the network watchdog and reset device 35 receives data from the peripheral device in response to the command, the network watchdog and reset device 35 determines, at 528, that the peripheral device is outputting data. If the network watchdog and reset device 35 does not receive data from the peripheral device in response to the command, the router device 32 determines at 528 that the wireless access point device 33 is not outputting data.

If the network watchdog and reset device 35 determines at 528 that the peripheral device is outputting data, the method proceeds to 530. If the network watchdog and reset device 35 determines at 528 that the peripheral device is not outputting data, the method returns to 524. The process may return to 524 from 528 a predetermined number of times, and then proceed to 530, for example, if the network watchdog and reset device 35 cannot confirm that the peripheral device is outputting data. Each time the process returns to 524 from 528, the network watchdog and reset device 35 may increase the value of the predetermined delay period that is used at 526, for example, by adding a predetermined value to the value of the delay period previously used at 526.

At 530, the network watchdog and reset device 35 determines whether there are more peripheral devices that are to have their power cycled. For example, at 530, the microprocessor 50 may access a table or other suitable data structure stored in the memory 52 or the memory 56 and determine whether it contains an indication that any of the peripheral devices have not been reset in a most recent network outage event. If the microprocessor 50 determines at 530 that the table contains an indication that at least one of the peripheral devices have not been reset in a most recent network outage event, the method proceeds to 524 where power to the next highest priority peripheral device is cycled, for example. If the microprocessor 50 determines at 530 that the table does not contain an indication that at least one of the peripheral devices have not been reset in the most recent network outage event, the method returns to 502.

At 532, the network watchdog and reset device 35 determines whether data out of the modem device 31 has been interrupted. In one or more embodiments, the network watchdog and reset device 35 pings a local IP address of the modem device 31, as described above. If the network watchdog and reset device 35 receives a response to one or more of the pings, the network watchdog and reset device 35 determines at 532 that data out of the modem device 31 has not been interrupted. If the network watchdog and reset device 35 does not receive a response to the pings, the network watchdog and reset device 35 determines at 510 that data out of the modem device 31 has been interrupted.

Additionally or alternatively, in one or more embodiments at 532, the network watchdog and reset device 35 receives log data from a web server provided by the modem device 31, as described above. The microprocessor 50 performs a text search on the log data to determine whether one or more predetermined words or phrases indicating that data out of the modem 31 has been interrupted since the last time the network watchdog and reset device 35 checked the log data. If the one or more of the predetermined words or phrases are found, the network watchdog and reset device 35 determines at 532 that data out the modem device 31 has been interrupted. If the one or more of the predetermined words or phrases are not found, the network watchdog and reset device 35 determines at 532 that data out of the modem device 31 has not been interrupted.

If the network watchdog and reset device 35 determines at 532 that the data out of the modem device 31 has been interrupted, the method proceeds to 534. If the network watchdog and reset device 35 determines at 532 that the data out of the modem device 31 has not been interrupted, the method proceeds to 536.

At 534, the network watchdog and reset device 35 determines whether data out of the modem device 31 has been restored. In one or more embodiments, the network watchdog and reset device 35 pings a local IP address of the modem device 31, as described above. If the network watchdog and reset device 35 receives a response to one or more of the pings, the network watchdog and reset device 35 determines, at 534, that data out of the modem device 31 has been restored. If the network watchdog and reset device 35 does not receive a response to the pings, network watchdog and reset device 35 determines, at 534, that data out of the modem device 31 has not been restored.

Additionally or alternatively, in one or more embodiments, at 534, the network watchdog and reset device 35 receives log data from a web server provided by the modem device 31, as described above. The microprocessor 50 performs a text search on the log data to determine whether one or more predetermined words or phrases indicating that data out of the modem 31 has been restored since the last time the network watchdog and reset device 35 checked the log data. If the one or more of the predetermined words or phrases are found, the network watchdog and reset device 35 determines, at 534, that data out the modem device 31 has been restored. If the one or more of the predetermined words or phrases are not found, the network watchdog and reset device 35 determines, at 534, that data out of the modem device 31 has not been restored.

If the network watchdog and reset device 35 determines, at 534, that the data out of the modem device 31 has been restored, the method proceeds to 512. If the network watchdog and reset device 35 determines, at 534, that the data out of the modem device 31 has not been restored, the method proceeds to 506.

At 536, the network watchdog and reset device 35 determines whether data into a peripheral device has been interrupted. For example, the network watchdog and reset device 35 first determines whether data into a highest priority peripheral device has been interrupted. In one or more embodiments, the network watchdog and reset device 35 transmits to the peripheral device a control signal including a command that, when processed by the peripheral device, causes the peripheral device to provide status information indicating whether data into the peripheral device has been interrupted. If the status information indicates that data into the peripheral device has been interrupted, the network watchdog and reset device 35 determines, at 536, that data into the peripheral device has been interrupted. If the status information does not indicates that data into the peripheral device has been interrupted, the network watchdog and reset device 35 determines, at 536, that data into the peripheral device has not been interrupted.

If the network watchdog and reset device 35 determines, at 536, that the data into the peripheral device has been interrupted, the method proceeds to 538. If the network watchdog and reset device 35 determines, at 536, that the data into the peripheral device has not been interrupted, the method proceeds to 540.

At 538, the network watchdog and reset device 35 determines whether data into the peripheral device has been restored. In one or more embodiments, the network watchdog and reset device 35 transmits to the peripheral device a control signal including a command that, when processed by the peripheral device, causes the peripheral device to provide status information indicating whether data into the peripheral device has been restored. If the status information indicates that data into the peripheral device has been restored, the network watchdog and reset device 35 determines, at 538, that data into the peripheral device has been restored. If the status information does not indicate that data into the peripheral device has been restored, the network watchdog and reset device 35 determines, at 538, that data into the peripheral device has not been restored.

If the network watchdog and reset device 35 determines at 538 that data into the peripheral device has been restored, the method proceeds to 516. If the network watchdog and reset device 35 determines at 538 that the data into the peripheral device has not been restored, the method proceeds to 512.

At 540, the network watchdog and reset device 35 determines whether the data out of the peripheral device is interrupted. In one or more embodiments, at 540, the network watchdog and reset device 35 wirelessly pings a local IP address of the peripheral device. If the network watchdog and reset device 35 receives a response to the pings, the network watchdog and reset device 35 determines, at 540, that data out of the peripheral device is not interrupted. If the network watchdog and reset device 35 does not receive a response to the pings, the router device 32 determines, at 540, that data out of the peripheral device is interrupted.

Additionally or alternatively, in one or more embodiments, at 540, the network watchdog and reset device 35 transmits to the peripheral device a command that, when processed by the peripheral device, causes the peripheral device to transmit data, for example, to the watchdog and reset device 35. If the network watchdog and reset device 35 receives data from the peripheral device in response to the command, the network watchdog and reset device 35 determines, at 540, that the data out of the peripheral device is not interrupted. If the network watchdog and reset device 35 does not receive data from the peripheral device in response to the command, the router device 32 determines, at 540, that data out of the peripheral device is interrupted.

As a further alternative, the watchdog 35 can listen on the network and if no data is placed on the network by a particular peripheral device within an expected time, the watchdog can conclude that the peripheral device is not outputting data and continue to step 524. In one embodiment, it can perform other tests, as just described above to determine if the peripheral is putting out data, as described with respect to FIG. 6.

In one or more embodiments, if the network watchdog and reset device 35 determines at 540 that the data out of the peripheral device is interrupted, the watchdog and reset device 35 transmits to the set-top box 44 a command or message which, when processed by the set-top box 44, causes the set-top box 44 to output to the television 26 a video signal including a message indicating that data out of the peripheral device is interrupted. When the television 26 displays the message, the user 12 is informed that a problem with the peripheral device has been detected and is being addressed by the network watchdog and reset device 35. Additionally or alternatively, the watchdog and reset device 35 may transmit to the computer 28 a command or message which, when processed by the computer 28, causes the computer 28 to output to a display device a video signal including the message indicating that data out of the peripheral device is interrupted. Additionally or alternatively, the watchdog and reset device 35 may transmit to the cell phone 38 a command or message which, when processed by the cell phone 38, causes the cell phone 38 to display a video signal including the message indicating that data out of the peripheral device is interrupted.

In one or more embodiments, the memory 56 of the network watchdog and reset device 35 stores a table or other suitable data structure including an identifier of each peripheral device that is associated with a respective location and a respective type of the peripheral device. The message displayed by the television 26, the display device coupled to the computer 28, and/or the cell phone 38 may identify the particular peripheral device that has been determined to have interrupted data output. For example, the message may indicate that data out of the security camera 40 in the kitchen 16 is interrupted and is being addressed by the network watchdog and reset device 35.

If the network watchdog and reset device 35 determines, at 540, that the data out of the peripheral device is interrupted, the method proceeds to 538 in one embodiment. If the network watchdog and reset device 35 determines, at 540, that data out of the peripheral device is not interrupted, the method proceeds to 542. In one embodiment at 542, the network watchdog and reset device 35 determines whether there are more peripheral devices that need to be checked. For example, at 542, the microprocessor 50 may access a table or other suitable data structure stored in the memory 52 or the memory 56 and determine whether it contains an indication that any of the peripheral devices have not been checked in a most recent checking cycle. If the microprocessor 50 determines, at 542, that the table contains an indication that at least one of the peripheral devices have not been checked in the most recent checking cycle, the method returns to 536 where the next highest priority peripheral device is checked, for example. If the microprocessor 50 determines, at 542, that the table contains does not contain an indication that at least one of the peripheral devices has not been checked in the most recent checking cycle, the method returns to 502.

Figure 6:
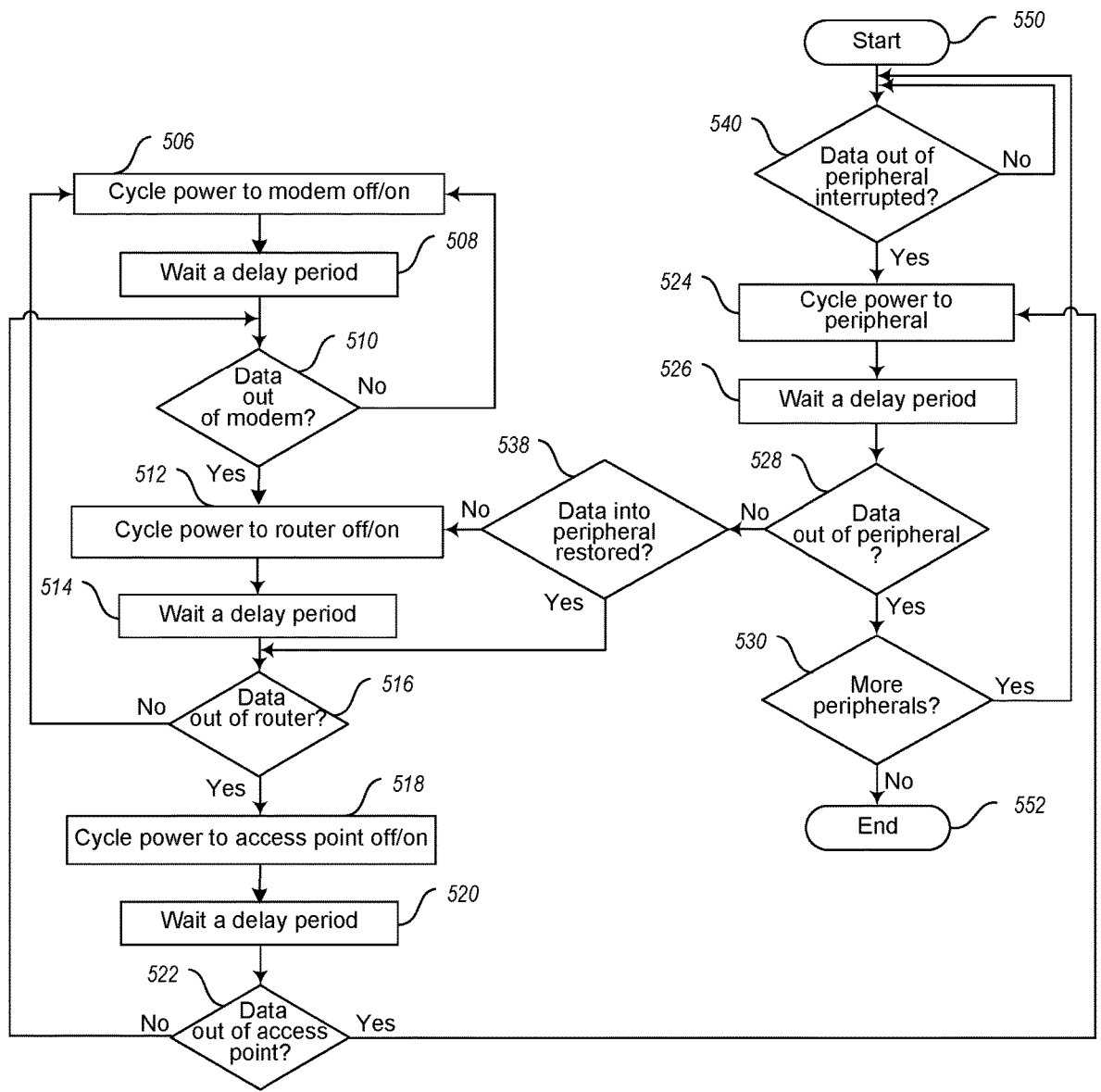
FIG. 6 is a flowchart of a method performed by a network watchdog and reset device, according to another embodiment of the present disclosure.

As shown in FIG. 6, in one embodiment, the process flow starts somewhat differently, with the data out of peripheral device being interrupted 540, being the first step performed. Namely, the flowchart can start at 550 and then proceed to 540 to determine if the data out of the peripheral has been interrupted. Acts that are the same in FIGS. 5 and 6 are identified by the same reference number, and are not described again for the sake of brevity. The process flow of the flowchart shown in FIG. 6 ends at 552. The network watchdog and reset device 35 may periodically repeat the process flow of the flowchart shown in FIG. 6 at regular intervals, for example, every fifteen minutes.

As previously described, if the network watchdog and reset device 35 determines at 540 that the data out of the peripheral device is interrupted, the watchdog and reset device 35 may transmit to the set-top box 44, the computer 28, and/or the cell phone 38 a message indicating that data out of the peripheral device is interrupted. Similarly, in one or more embodiments, if the network watchdog and reset device 35 determines at 528 that the data out of the peripheral device is restored, the network watchdog and reset device 35 transmits a command or message which, when processed by the set-top box 44, causes the set-top box 44 to output to the television 26 a video signal including a message indicating that data out of the peripheral device is restored. When the television 26 displays the message, the user 12 is informed that the problem with the peripheral device that was previously detected has been resolved. Additionally or alternatively, the watchdog and reset device 35 may transmit to the computer 28 a command or message which, when processed by the computer 28, causes the computer 28 to output to a display device a video signal including the message indicating that the problem with the peripheral device that was previously detected has been resolved. Additionally or alternatively, the watchdog and reset device 35 may transmit to the cell phone 38 a command or message which, when processed by the cell phone 38, causes the cell phone 38 to display a video signal including the message indicating that the problem with the peripheral device that was previously detected has been resolved. The message displayed by the television 26, the display device coupled to the computer 28, and/or the cell phone 38 may identify the particular peripheral device that has been determined to have interrupted data output. For example, the message may indicate that the problem with the security camera 40 in the kitchen 16 has been resolved.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a broadband watchdog device, the method comprising:

determining, by the broadband watchdog device, that data out of a peripheral device has been interrupted;

in response to determining that the data out of the peripheral device has been interrupted, transmitting, by the broadband watchdog device, a first control signal, the first control signal causing a process that runs on the peripheral device to restart;

a first predetermined delay period after the transmitting of the first control signal, determining, by the broadband watchdog device, whether the peripheral device is outputting data;

in response to determining that the peripheral device is not outputting data, determining, by the broadband watchdog device, whether data into the peripheral device has been restored;

after determining that the data into the peripheral device has not been restored, transmitting, by the broadband watchdog device, a second control signal, the second control signal causing a process that runs on a router device to restart;

a second predetermined delay period after the transmitting of the second control signal, determining, by the broadband watchdog device, whether the router device is outputting data;

in response to determining that the router device is outputting data, transmitting, by the broadband watchdog device, a third control signal, the third control signal causing a process that runs on a wireless access point device that is coupled to the router device to restart; and a third predetermined delay period after the transmitting of the third control signal, determining, by the broadband watchdog device, whether the wireless access point device is outputting data.

2. The method according to claim 1, further comprising:

in response to determining that the wireless access point device is outputting data, transmitting, by the broadband watchdog device, a fourth control signal, the fourth control signal causing the process that runs on the peripheral device to restart; and a fourth predetermined delay period after the transmitting of the fourth control signal, determining, by the broadband watchdog device, whether the peripheral device is outputting data.

3. The method according to claim 2, further comprising:

in response to determining that the peripheral device is outputting data, determining, by the broadband watchdog device, whether there is another peripheral device;

in response to determining that there is another peripheral device, determining, by the broadband watchdog device, that data out of the other peripheral device has been interrupted;

in response to determining that the data out of the other peripheral device has been interrupted, transmitting, by the broadband watchdog device, a fifth control signal, the fifth control signal causing a process that runs on the other peripheral device to restart; and a fifth predetermined delay period after the transmitting of the fifth control signal, determining, by the broadband watchdog device, whether the other peripheral device is outputting data.

4. The method according to claim 1, further comprising:
transmitting, by the broadband watchdog device, to a set-top box a first message, the first message indicating that a problem with the peripheral device has been detected; and
outputting from the set-top to a display device a video signal including the first message indicating that the problem with the peripheral device has been detected.

5. The method according to claim 4, further comprising:
transmitting, by the broadband watchdog device, to the set-top box a second message, the second message indicating that the problem with the peripheral device has been resolved; and
outputting from the set-top to the display device a video signal including the second message indicating that the problem with the peripheral device has been resolved.

6. The method according to claim 5, further comprising:
displaying, by the display device, the first message indicating that the problem with the peripheral device has been detected; and
displaying, by the display device, the second message indicating that the problem with the peripheral device has been resolved.

7. The method according to claim 4, wherein the first message includes at least one of: a location of the peripheral device and a type of the peripheral device.

8. The method according to claim 1, wherein the first predetermined delay period, the second predetermined delay period, and the third predetermined delay period are different.

9. The method according to claim 1, further comprising:
transmitting, by the broadband watchdog device, to a computer a first message, the first message indicating that a problem with the peripheral device has been detected.

10. The method according to claim 9, further comprising:
transmitting, by the broadband watchdog device, to the computer a second message, the second message indicating that the problem with the peripheral device has been resolved.

11. A broadband watchdog device, comprising:
a processor; and
a memory storing instructions that, when executed by the processor, cause the device to:
determine that data out of a peripheral device has been interrupted;
in response to determining that the data out of the peripheral device has been interrupted, transmit a first control signal, the first control signal causing a process that runs on the peripheral device to restart;
a first predetermined delay period after the first control signal is transmitted, determine whether the peripheral device is outputting data;
in response to determining that the peripheral device is not outputting data, determine whether data into the peripheral device has been restored;
after determining that the data into the peripheral device has not been restored, transmit a second control signal, the second control signal causing a process that runs on a router to restart;
a second predetermined delay period after the second control signal is transmitted, determine whether a router device is outputting data;
in response to determining that the router device is outputting data, transmit a third control signal, the third control signal causing a process that runs on a wireless access point device that is coupled to the router device to restart; and
a third predetermined delay period after the third control signal is transmitted, determine whether the wireless access point device is outputting data.

12. The broadband watchdog device according to claim 11, wherein the memory stores instructions that, when executed by the processor, cause the device to:
in response to determining that the wireless access point device is outputting data, transmit a fourth control signal, the fourth control signal causing the process that runs on the peripheral device to restart; and
a fourth predetermined delay period after the fourth control signal is transmitted, determine whether the peripheral device is outputting data.

13. The broadband watchdog device according to claim 12, wherein the memory stores instructions that, when executed by the processor, cause the device to:
in response to determining that the peripheral device is outputting data, determine whether there is another peripheral device;
in response to determining that there is another peripheral device, determine that data out of the other peripheral device has been interrupted;
in response to determining that the data out of the other peripheral device has been interrupted, transmit a fifth control signal, the fifth control signal causing a process that runs on the other peripheral device to restart; and
a fifth predetermined delay period after the fifth control signal is transmitted, determine whether the other peripheral device is outputting data.

14. The broadband watchdog device according to claim 11, wherein the memory stores instructions that, when executed by the processor, cause the device to:
transmit to a set-top box a first message, the first message indicating that a problem with the peripheral device has been detected.

15. The broadband watchdog device according to claim 14, wherein the memory stores instructions that, when executed by the processor, cause the device to:
transmit to the set-top box a second message, the second message indicating that the problem with the peripheral device has been resolved.

16. The broadband watchdog device according to claim 15, wherein the memory stores instructions that, when executed by the processor, cause the device to:
cause the first message indicating that the problem with the peripheral device has been detected to be displayed; and
cause the second message indicating that the problem with the peripheral device has been resolved to be displayed.

17. The broadband watchdog device according to claim 14, wherein the first message includes at least one of: a location of the peripheral device and a type of the peripheral device.

18. The broadband watchdog device according to claim 11, wherein the first predetermined delay period, the second predetermined delay period, and the third predetermined delay period are different.

19. The broadband watchdog device according to claim 11, wherein the memory stores instructions that, when executed by the processor, cause the device to:
transmit a first message to a computer, the first message indicating that a problem with the peripheral device has been detected.

20. The broadband watchdog device according to claim 19, wherein the memory stores instructions that, when executed by the processor, cause the device to:
transmit a second message to the computer, the second message indicating that the problem with the peripheral device has been resolved.

\* \* \* \* \*